No. 776,057. PATENTED NOV. 29, 1904.
R. M. HAMMOND.
DISK SHARPENING MACHINE.
APPLICATION FILED MAY 5, 1904.
NO MODEL. 2 SHEETS—SHEET 1.
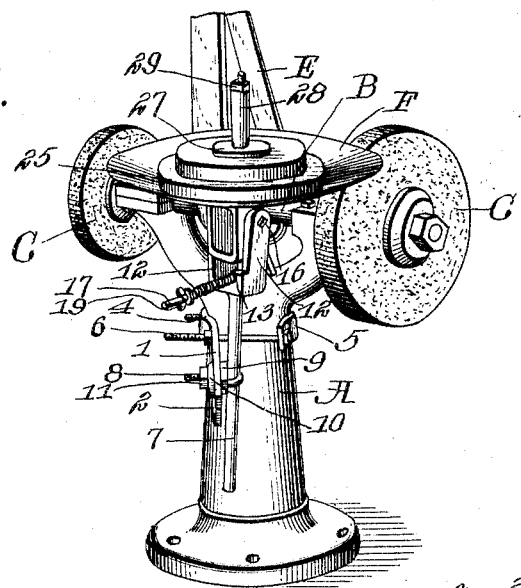
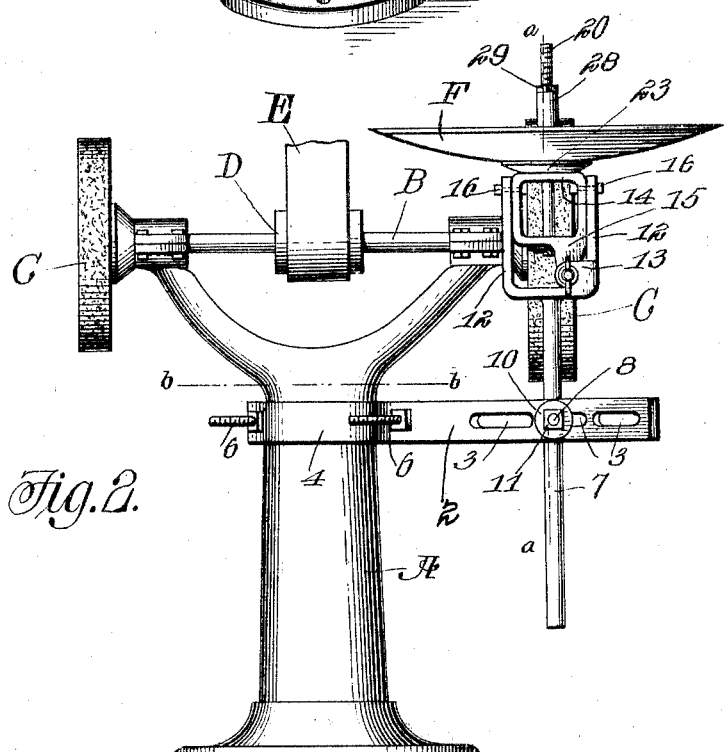
Inventor
Royal M. Hammond
Witnesses No. 776,057. PATENTED NOV. 29, 1904.
R. M. HAMMOND.
DISK SHARPENING MACHINE.
APPLICATION FILED MAY 5, 1904.
NO MODEL. 2 SHEETS—SHEET 2.

Inventor
Royal M. Hammond

Witnesses

By
Attorney

No. 776,057.

Patented November 29, 1904.

UNITED STATES PATENT OFFICE.

ROYAL M. HAMMOND, OF DOWNS, KANSAS.

DISK-SHARPENING MACHINE.

SPECIFICATION forming part of Letters Patent No. 776,057, dated November 29, 1904.

Application filed May 5, 1904. Serial No. 206,544. (No model.)

*To all whom it may concern:*

Be it known that I, ROYAL M. HAMMOND, a citizen of the United States, residing at Downs, in the county of Osborne and State of Kansas, have invented certain new and useful Improvements in Disk-Sharpening Machines; and I do declare the following to be a full, clear, and exact description of the invention, such as will enable others skilled in the art to which it appertains to make and use the same.

My invention is an improved disk-sharpening machine; and it consists in the construction, combination, and arrangement of devices hereinafter described and claimed.

The object of this invention is to provide an improved disk-sharpening machine which may be attached to any of the common emery-stands now in use and with which the disks of plows, harrows, and other agricultural implements may be readily, speedily, and accurately sharpened.

A further object of the invention is to provide improved means for holding the disk which may be adjusted to accommodate itself to a disk of any size and shape and to support the disk in the required position to cause it to be ground or sharpened at any desired bevel.

A further object of the invention is to provide improved means to hold the disk securely, which means when the disk is being ground will enable the latter also to be revolved by the action of the emery-wheel or grindstone and whereby the disk may be pressed by any desired degree of force against the grindstone or emery-wheel while being sharpened.

Figure 3:
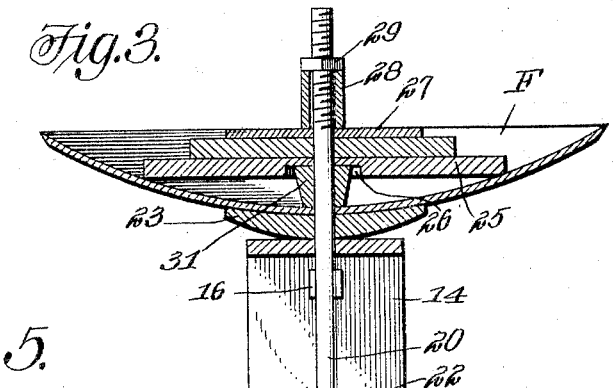
Figure 5:
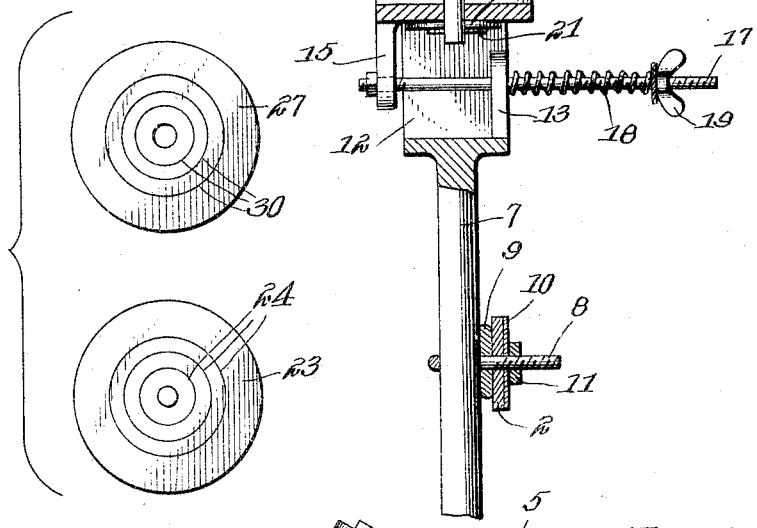
Figure 4:
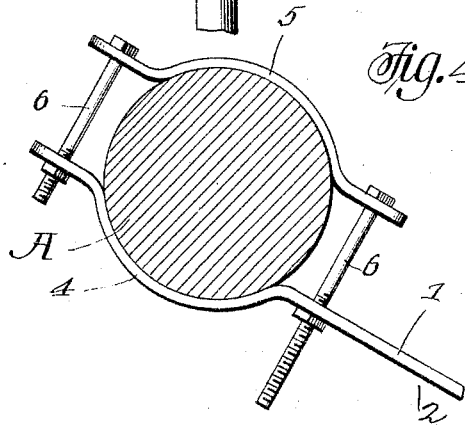

In the accompanying drawings, Figure 1 is a perspective view of a disk-sharpening machine embodying my improvements, showing the same attached to an emery-stand of ordinary construction and provided with a disk to be sharpened. Fig. 2 is a side elevation of the same. Fig. 3 is a detail sectional view taken on the plane indicated by the line *a a* of Fig. 2, and Fig. 4 is a detail sectional view taken on the plane indicated by the line *b b* of Fig. 2.

The disk-holder-supporting bracket 1 has an arm 2, which is provided at and near its outer end with adjusting-slots 3 of suitable length. Near its inner end the said bracket is curved outwardly, as at 4, to enable it to fit snugly against one side of the pedestal or stand A, which carries the usual shaft B, having the grindstones or emery-wheels C and the pulley D for rotation by a power-belt E. On the side of the stand A opposite the arm 2 is a yoke 5, which is reversely curved to engage the said side of the stand. The said yoke and the arm 2 are provided with openings for the reception of bolts 6, which are employed for connecting them together and clamping them firmly on the stand, so that the arm 2 may be secured thereto at any desired adjustment and in any required position.

A holder-bar 7 is secured to the bracket-arm 2 at any suitable vertical adjustment, at any suitable inclination, and at any required distance from the outer end of the said arm 2 by means of an eyebolt 8, the said eyebolt engaging and being adjustable in one of the slots 3, as shown. The eyebolt is here shown as provided with a clamping-link 9, a washer 10, and a nut 11. The said devices serve to secure the holder-bar firmly to the bracket-arm 2 at any desired adjustment, as will be understood. At the upper end of the holder-bar are a pair of forked arms 12, and near the lower end of one of said arms, on the inner side thereof, is a lug 13. Between the said forked arms is pivotally mounted a disk or holder 14, which may be either of the form here shown or of any other suitable form and is provided at its lower end on one side, which I will call its "outer" side, with a depending lug 15, which is disposed opposite the lug 13 on the holder-bar. Bolts 16 are here shown for pivotally mounting the disk-holder between the forked arms of the holder-bar. Any other suitable means may be employed for this purpose, and I do not desire to limit myself in this particular. The disk-holder may turn angularly with respect to the holder-bar by means of an adjusting-bolt 17, which passes through openings in the lugs 13 15 and is provided with a tension-spring 18 and a winged nut 19. By turning the said nut the disk-holder may be set at any desired inclination. The spring forms a yielding connection between the disk-holder and the holder-bar, which gives the disk-holder angular motion independent of the holder-bar to compensate for any imperfection in the shape of the disk which is being ground, so that a disk which is not true in shape will nevertheless have all parts of its edge ground alike and sharpened at the required bevel.

The clamping-bolt 20 has its lower portion passed through openings in the upper and lower sides of the disk-holder and secured thereto by a key 21 and a washer 22, the latter bearing against the under side of the disk-holder. The said clamping-bolt is provided with a disk-seat 23, which is concavo-convex, with its concave side uppermost. The disk-seat bears on the upper side of the disk-holder and is provided on its upper side with a series of circles 24, which are concentrically disposed and which enable the disk (indicated at F) to be readily centered on the disk-seat. On the upper concave side of the disk is placed a muffler 25, which is circular in form and is provided in its under side at its center with a circular recess 26. The muffler has a central opening through which the clamping-bolt extends, and the muffler is preferably made of soft and spongy wood. The muffler may be made of any suitable material. Its function is to prevent excessive vibration of the disk while it is being ground and render the same comparatively noiseless. On the upper side of the muffler is a washer 27 of suitable size and material. A tubular sleeve 28, through which the clamp-bolt extends, bears on the upper side of the washer, and on the upper end of the said tubular sleeve there is a nut 29, which is screwed on the clamping-bolt and which serves in coaction with the disk-seat, the washer, the tubular sleeve, and the muffler to firmly clamp the disk in place. The clamping-bolt is revoluble in the disk-holder, so that the disk is revolved by the action of the emery-wheel or grindstone employed to grind and bevel the edge of the disk. By adjusting the holder-bar and the disk-holder the disk may be caused to revolve at any desired rate of speed. By thus enabling the disk to be revolved by the action of the stone or emery-wheel employed to grind it it is prevented from being ground to too great an extent at any point and from becoming heated to such a degree as to draw its temper.

The washer 27 is provided on its under side with centering-circles 30, which are useful in centering the disk on the revolving clamping-bolt, which serves as the supporting-axle for the disk. The disk-seat is keyed or otherwise suitably secured to the said bolt 20. The centering-circles on the disk-seat are especially useful when the disk which is being ground has a hub on its lower side. The muffler is used on the upper side of the disk only in case the disk has no hub or has a hub only on its lower side. If the disk has a hub on its upper side, the muffler is placed on the bolt or axle 20 between the disk and the disk-seat. In the event that the disk is provided with a hub on each side neither the muffler nor the tubular sleeve 28 will be employed. Where the muffler is used on the upper side of the disk, as here shown, a cone 31, which is placed on the bolt or axle 20, is disposed in the recess 26 of the muffler and bears between the latter and the center of the disk, the said cone facilitating the centering of the disk.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. In a disk-sharpening machine, the combination with a supporting-stand, and a revoluble grinding element, of a bracket-arm, a holder-bar adjustably secured thereto, a disk-holder angularly adjustable on the holder-bar, a circular muffler, and means to secure a disk on the disk-holder for rotation and to hold the disk in engagement with the grinding element.

2. A disk-sharpener, comprising a supporting element having means whereby it may be secured to a grinding-stand, an element adjustable on said supporting element, a disk-holder carried by said adjustable element and connected thereto for angular adjustment, means to adjust the disk-holder, means to yieldingly maintain the same at any adjustment, and means to secure a disk on the holder for rotation thereon and in engagement with a revoluble grinding element.

3. A disk-sharpening device comprising a supporting element, a holder-bar adjustable longitudinally thereon and also adjustable vertically and angularly, a disk-holder mounted on the holder-bar, means to adjust the disk-holder angularly with respect to the holder-bar, means to yieldingly maintain the disk-holder at any required adjustment, and means to secure a disk on the disk-holder for rotation, substantially as described.

In testimony whereof I have hereunto set my hand in presence of two subscribing witnesses.

ROYAL M. HAMMOND.

Witnesses:
 L. E. PUGH,
 D. H. HARRISON.